Patented June 2, 1925.

1,540,580

UNITED STATES PATENT OFFICE.

RAYMOND MARK WARNER, OF AKRON, OHIO, ASSIGNOR TO THE MILLER RUBBER COMPANY, OF AKRON, OHIO, A CORPORATION OF OHIO.

METHOD OF VULCANIZING RUBBER.

REISSUED

No Drawing.   Application filed June 19, 1924.   Serial No. 721,076.

*To all whom it may concern:*

Be it known that I, RAYMOND M. WARNER, a citizen of the United States, and resident of Akron, in the county of Summit and State of Ohio, have invented certain new and useful Improvements in Methods of Vulcanizing Rubber, of which the following is a specification.

My present invention relates to vulcanization of rubber goods and more particularly to the use of certain compounding ingredients to prevent vulcanization of certain parts thereof.

There are several classes of rubber goods in which it is desirable to produce one part of an article of vulcanized rubber and another portion of the same article of unvulcanized rubber. A notable example is in the manufacture of inner tube patching material where it is desirable to build such material of two plies, one of which is vulcanized while the other is completely unvulcanized. For economic reasons it is desirable that the two compounds be united before being subjected to vulcanization and this insures a better bond between the two plies.

Where it is desired that a rubber compound should vulcanize it is usual to mix therewith sulphur or some sulphur containing ingredient. Sulphur and rubber alone would require an extremely long time to vulcanize and, as sulphur is of migratory properties, during such slow vulcanization sulphur would migrate throughout not only the stock in which it has been originally placed, but throughout the stock adjacent thereto in which sulphur had purposely been omitted. It is, therefore, evident that at least partial vulcanization of the entire mass would occur and would defeat the attempt to secure an article, part of which was unvulcanized. In the past in order to prevent such a result, it has been found necessary to heavily compound the stock which was to be vulcanized, and subjecting the articles to a high vulcanization temperature in attempts to substantially vulcanize the one stock before the other stock could attain appreciable vulcanization. Such attempts were not commercially reliable and the heavy compounding usually resulted in an inferior article.

The above process was improved upon by Morton and Harrison (U. S. Patent No. 1,478,576) who found that by the use of non-migratory accelerators the temperature required for vulcanization could be lowered to a point where vulcanization of compounds not containing such accelerators was impossible and that at such temperatures the sulphur would migrate to the accelerator-containing layer and would result in vulcanization of that layer only.

I find that in some cases it is desirable to obtain certain characteristics in the vulcanized rubber which are more easily obtained by the use of accelerators not suited to the Harrison and Morton process, due to their migratory nature.

In the search for a method of using migratory accelerators in situations similar to that described above, I have discovered a new class of compounding ingredients which from their nature I choose to call vulcanization retarding agents. These materials when added to compounds of rubber have a retarding action on vulcanization, and, therefore, produce an action opposite to that produced by accelerators. When added in sufficient quantities they prevent vulcanization completely.

Although my invention is applicable to the manufacture of various rubber articles and I do not care to confine my invention to any one article, as a matter of example I could say that inner tube patching material may be produced having one ply unvulcanized and the other ply completely vulcanized. In manufacturing such an article the parts or plies which it is desired to remain unvulcanized are compounded from rubber, sulphur, and vulcanization retarding material, whereas those parts or plies which are to become vulcanized are compounded from rubber, an accelerator and zinc oxide or other zinc salts. No sulphur is placed in the last named stock. The two compounds are calendered as two plies which are afterward super-imposed and subjected to vulcanizing heat. Sulphur from the sulphur-containing stock migrates to the stock containing accelerator and zinc causing vulcanization of the last named stock at low temperature. Accelerator may migrate to the sulphur-containing stock, but in the presence of the retarding agent no vulcanization will occur. It will be understood that if the sulphur and accelerator and zinc were all milled into one stock originally, premature vulcanization would occur so that by this method such prevulcanization is avoided.

As a specific example of such stocks I prepare two batches according to the following formulæ:

Batch 1.

| | Parts. |
|---|---|
| Pale crêpe rubber | 50 |
| Sulphur | 2 |
| Whiting | 47 |
| Stannous chloride | 1 |
| | 100 |

Batch 2.

| | Parts. |
|---|---|
| Pale crêpe rubber | 65 |
| Dimethyl-ammonium-dimethyl-dithio-carbamate | 1 |
| Zinc oxide | 2 |
| Whiting | 32 |
| | 100 |

Batch 1 I calender to a thickness of $\frac{1}{64}''$, and Batch 2 to a thickness of $\frac{1}{32}''$.

The two plies are super-imposed and placed in a heated oven for 20 hours at 180° F., when it will be found that the ply made from Batch 1 will be unvulcanized, whereas the ply made from Batch 2 will be completely vulcanized. In the above example the dimethyl-ammonium-dimethyl-dithio-carbamate is the accelerator and stannous chloride is the retarding agent. The whiting is not necessary to the results, but is used as a filling ingredient. Of course other filling or coloring ingredients may be used, as will be understood by those skilled in the art. Also other migratory accelerators may be used in place of the one stated.

I have found stannous chloride to be an excellent retarding agent, but other chemicals have been found to perform in the same manner. I have secured similar results with oxalic acid, potassium tetra-oxalate, citric acid, salicylic acid, tartaric acid, boric acid and succinic acid.

It will be understood that the retarder used is of a non-migratory nature.

Having thus described my invention, what I claim is—

1. The hereindescribed method of producing an article of rubber having one part vulcanized and another part unvulcanized, which consists in mixing two separate stocks, one containing rubber, sulphur and a vulcanization retarder, and the other rubber but no sulphur, juxtaposing said stocks, and subjecting the same to vulcanizing temperature.

2. The hereindescribed method of producing an article of rubber having one part vulcanized and another part unvulcanized, which consists in mixing two separate stocks, one containing rubber, sulphur and a vulcanization retarder, and the other rubber, an accelerator and a zinc salt but no sulphur, juxtaposing said stocks, and subjecting the same to vulcanizing temperature.

3. The hereindescribed method of producing an article of rubber having one part vulcanized and another part unvulcanized, which consists in mixing two separate stocks, one containing rubber, sulphur and a vulcanization retarder, and the other rubber, a migratory accelerator and a zinc salt, but no sulphur, juxtaposing said stocks, and subjecting the same to vulcanizing temperature.

4. The hereindescribed method of producing a sheet of rubber comprising two layers one of which is vulcanized and the other unvulcanized, which consists in compounding two stocks, one containing rubber, sulphur and a vulcanization retarder, and the other rubber but no sulphur, forming said stocks into sheets, superimposing said sheets one on the other, and subjecting the same to a vulcanizing temperature.

5. The hereindescribed method of producing a sheet of rubber comprising two layers one of which is vulcanized and the other unvulcanized, which consists in compounding two stocks, one containing rubber, sulphur and a vulcanization retarder, and the other rubber, an accelerator and a zinc salt, but no sulphur, forming said stocks into sheets, superimposing said sheets one on the other, and subjecting the same to a vulcanizing temperature.

6. The hereindescribed method of making an article having one part of vulcanized rubber and another part of unvulcanized rubber, which consists in mixing two separate stocks one containing rubber, sulphur and a vulcanization retarder, and the other rubber but no sulphur, juxtaposing said stocks in shape to form the desired article, and subjecting to curing temperature.

7. The herein described method of making an article having one part of vulcanized rubber and another part of unvulcanized rubber, which consists in mixing two separate stocks one containing rubber, sulphur and a vulcanization retarder, and the other rubber, an accelerator and a zinc salt but no sulphur, juxtaposing said stocks in shape to form the desired article, and subjecting to curing temperature.

8. The hereindescribed method of treating rubber which consists in incorporating in a sulphur containing portion thereof a vulcanization retarder and then subjecting the article to heat.

9. The method of treating rubber which consists in vulcanizing the rubber in the presence of stannous chloride acting as a retarder.

10. Masses and articles containing rubber, the vulcanization of which is retarded by the presence of stannous chloride.

In testimony whereof, I affix my signature.

RAYMOND MARK WARNER.